Figure 1:
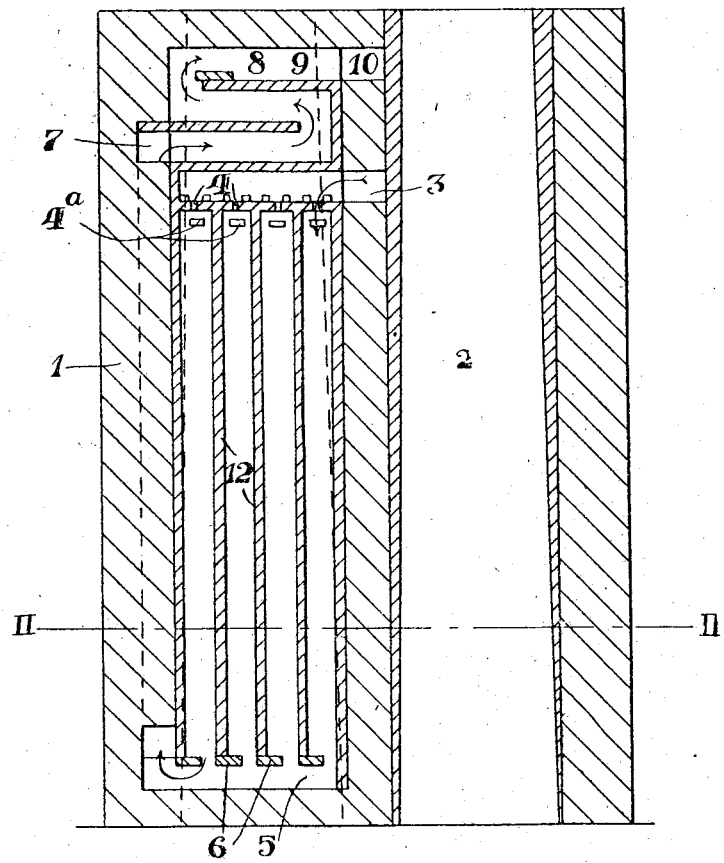

H. J. TOOGOOD.
MEANS FOR HEATING VERTICAL GAS RETORTS.
APPLICATION FILED JUNE 25, 1912.

1,055,837.

Patented Mar. 11, 1913.

7 SHEETS—SHEET 1.

Witnesses
Geo. A. Simonds
J. M. Copenhaver

Inventor
Herbert John Toogood
by Wm H Babcock & Son
Attorney

H. J. TOOGOOD.
MEANS FOR HEATING VERTICAL GAS RETORTS.
APPLICATION FILED JUNE 25, 1912.
1,055,837.
Patented Mar. 11, 1913.
7 SHEETS—SHEET 2.
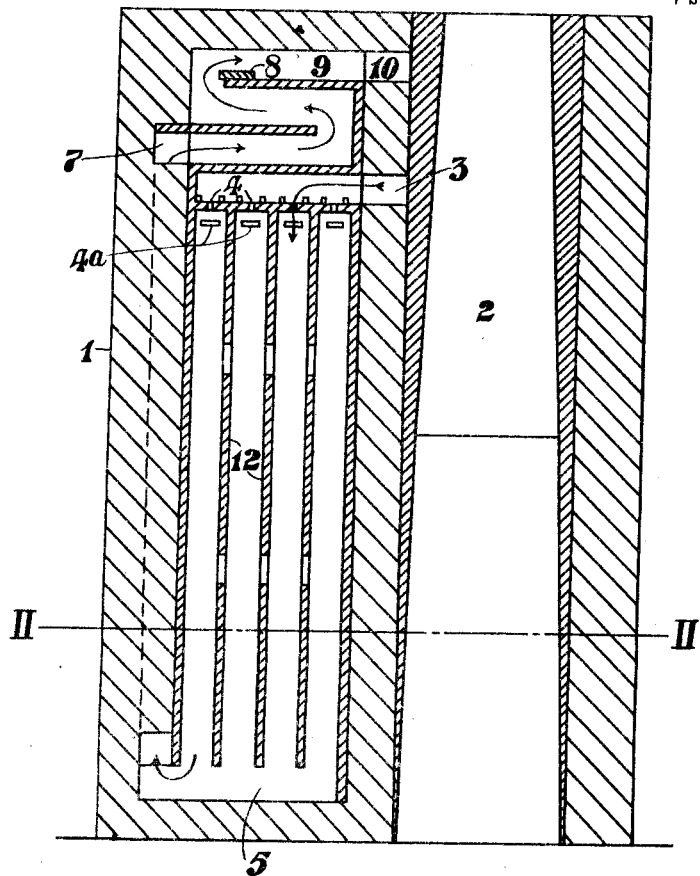
Fig 1.ᴬ
Fig 2.ᴬ
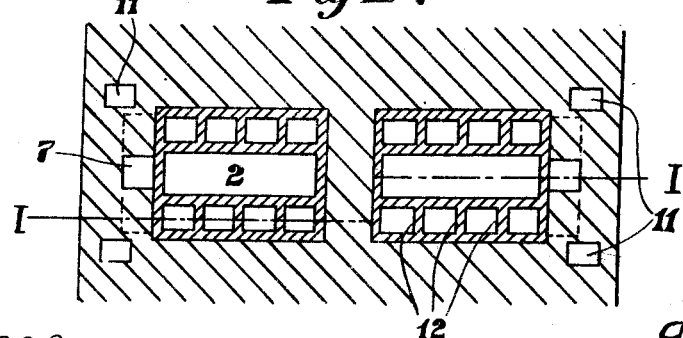
Witnesses
H. F. Rueth
G. M. Copenhaver.
Inventor
Herbert John Toogood
by Wm H Babcock & Son
Attorneys

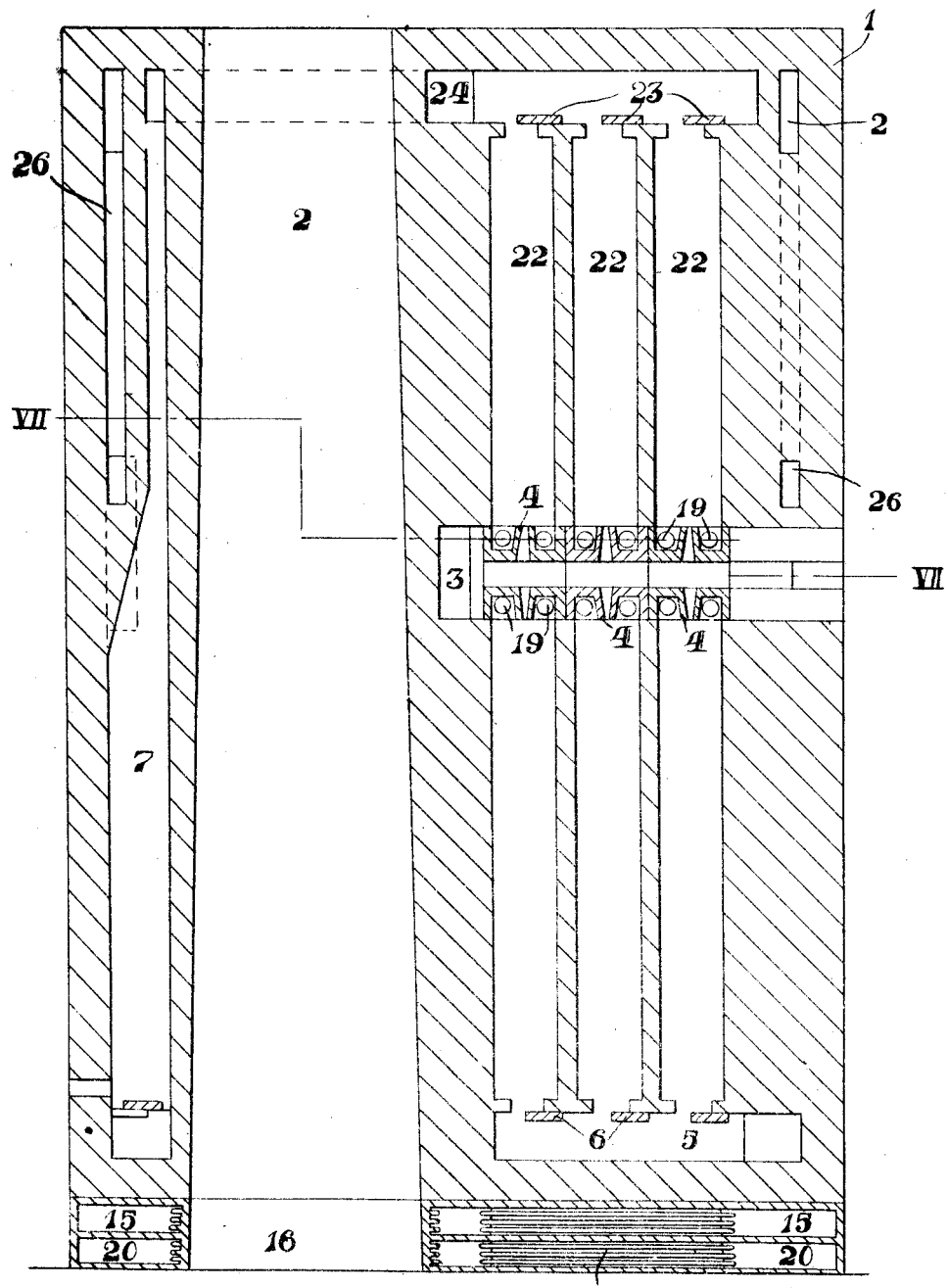

H. J. TOOGOOD.
MEANS FOR HEATING VERTICAL GAS RETORTS.
APPLICATION FILED JUNE 25, 1912.

1,055,837.

Patented Mar. 11, 1913.
7 SHEETS—SHEET 7.

UNITED STATES PATENT OFFICE.

HERBERT JOHN TOOGOOD, OF ELLAND, ENGLAND, ASSIGNOR TO ROBERT DEMPSTER & SONS, LIMITED, OF ELLAND, ENGLAND.

MEANS FOR HEATING VERTICAL GAS-RETORTS.

1,055,837.             Specification of Letters Patent.          Patented Mar. 11, 1913.

Application filed June 25, 1912. Serial No. 705,775.

*To all whom it may concern:*

Be it known that I, HERBERT JOHN TOOGOOD, a subject of the King of Great Britain and Ireland, residing at The Poplars, Elland, in the county of York, England, have invented certain new and useful Improvements in Means for Heating Vertical Gas-Retorts, of which the following is a specification.

This invention relates to vertical gas retorts of the type known as "continuous" or "semi-continuous", and its principal object is to heat such retorts in the most efficient manner, utilizing the waste heat as fully as possible, so as to obtain a maximum production of gas and residuals with a minimum consumption of fuel.

According to my invention I employ two streams of fuel gases for heating the length of the retorts, traveling either upward or downward as may be found most advantageous, one of such streams heating the lower portion of the retorts and the other the upper portion. The maximum heat can thus be applied to the portion of the charge where it will be most efficient in the production of good gas.

In a continuous vertical retort, which necessarily contains coal in every stage of carbonization at the same time, beginning with the cold coal at the top, in practice it is found that an empty space is sometimes formed at the top of the retort owing to occasional hanging up of the coal in the feeding hopper. Consequently it is desirable to avoid applying the maximum heat to the extreme top of the retort, which would otherwise become overheated, and crack the gas on its way from the charge to the take-off opening; and further, were the maximum temperature applied to the extreme top of the retort, much heat would be lost by excessive radiation losses through the bench top, which besides wasting fuel, would interfere with the work of the stokers. It is also desirable that the coal as soon as it enters the retort should be quickly heated to a fairly high temperature, in order that the liquids formed may be quickly vaporized, as otherwise these liquids would destroy the porosity of the cap of the charge, and thus hinder the free escape of the gases which are simultaneously being evolved in the lower part of the charge. From these considerations it appears that the top of the retort should be heated to a temperature intermediate between the temperature of combustion and the sensible heat of the products of combustion termed waste heat, the maximum heat being applied at a point some distance from the top of the retort, and the heating gases or the main portion thereof then traveling downward. The ring or annular wall of coke formed at the point of application of the maximum heat will then slowly conduct the heat to the central core of coal as they travel down the retort, assisted by the heat received through the walls of the retort, from the descending stream or streams of heating gases, until toward the base of the retort the mass of the charge will be fairly uniform and high in temperature throughout, a higher average temperature of the cross section of the charge being probably reached toward the bottom than at the point of maximum application of outside heat.

In order that each cross section of the charge may be uniformly heated, a flue may be applied to the side of the retort which faces the outside wall of the setting, thereby counteracting excessive radiation losses from this portion of the charge.

As at present the case with existing plants, where the retorts are relatively small, they can be made of fireclay, and a zig-zag path of heating gases may be employed; while in larger retorts, which are built up of grooved and tongued blocks, vertical flues are preferable, so that the vertical walls dividing the flues may cover the vertical joints between the blocks. Opinion is divided as to the movements of the particles of the charge in a continuous vertical retort, one opinion being that the central core, being of higher specific gravity and free from skin friction against the sides of the retort, would descend faster than the outer ring, and that the side particles would continuously roll in toward the center. My own experiments, however, show that although this does occur in a hopper having an average cross-sectional area many times greater than that of its outlet, yet in a vessel of such proportions as my vertical retorts this rolling tendency is practically non-existent, the charge moving downward steadily, with only such slight displacements as are necessary to fill the varying cross-section of the retort. This fact has an important bearing on the method of heating the core of the charge, as this core will be of coal surrounded by a ring of coke moving down the retort, the ring gradually becoming thicker and the core thinner until about half-way down the retort the coal disappears, and is merged in a complete cross-section of coke of varying temperature, the central parts of course being the coolest. As the charge descends farther additional heat is imparted from the outer to the inner parts, and the temperature of the outer parts is maintained or augmented by conduction from the heating flues, until toward the bottom the complete cross-section of the charge will have attained approximately uniform temperature as before mentioned.

In order to prevent the coal in the feeding hopper becoming sticky by reason of the heat from the retort being conducted up the ironwork, the parts of the setting adjacent to the top of the retort may be filled in with fireclay.

The taper of the retorts is preferably sharper in the upper than in the lower portion, in order to provide for the expansion of the coal when first heated, and facilitate the uniform downward progress thereof.

Figure 2:
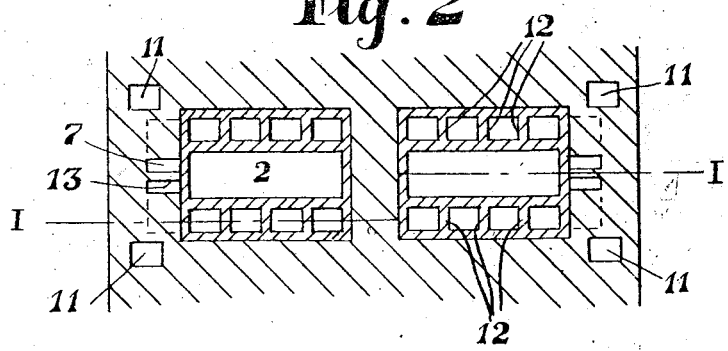
Figure 4:
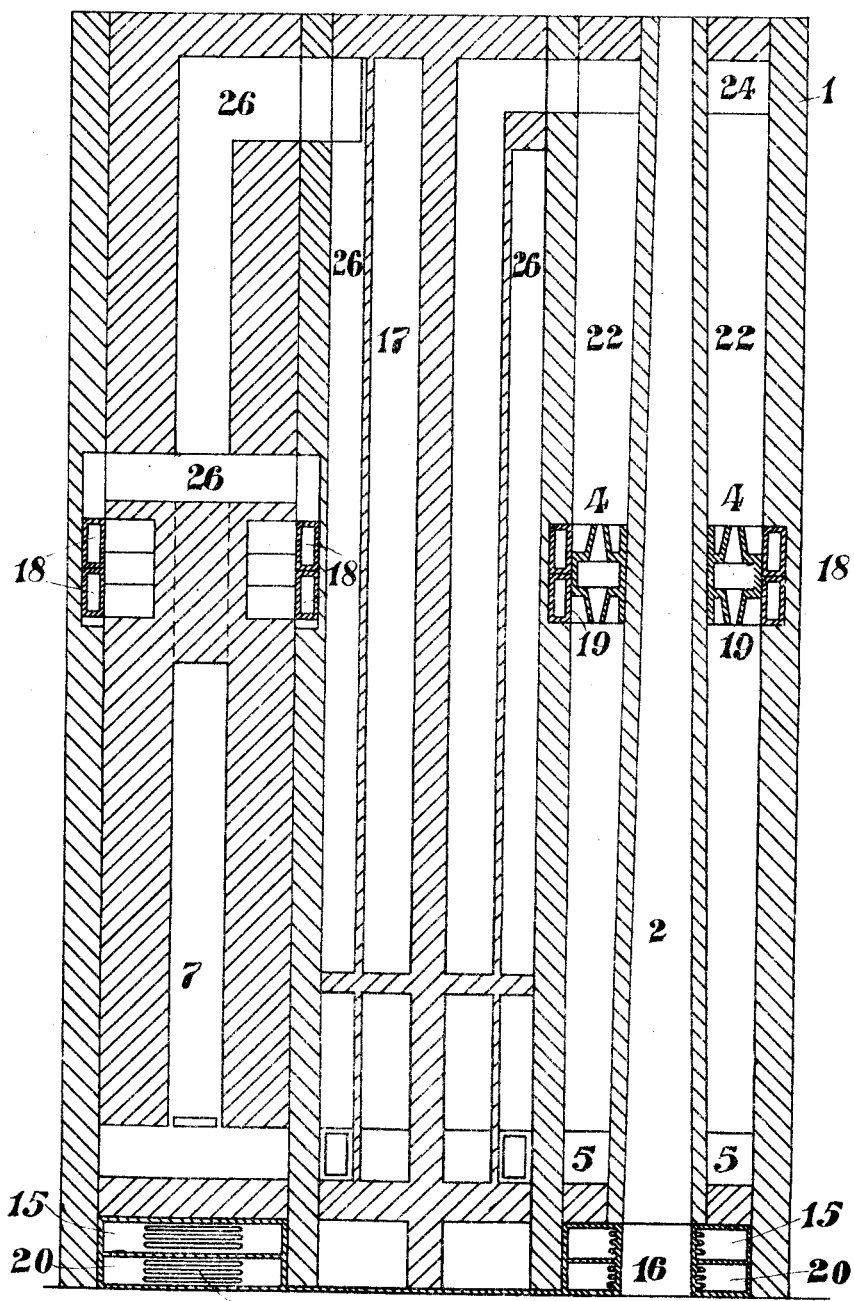
Figure 5:
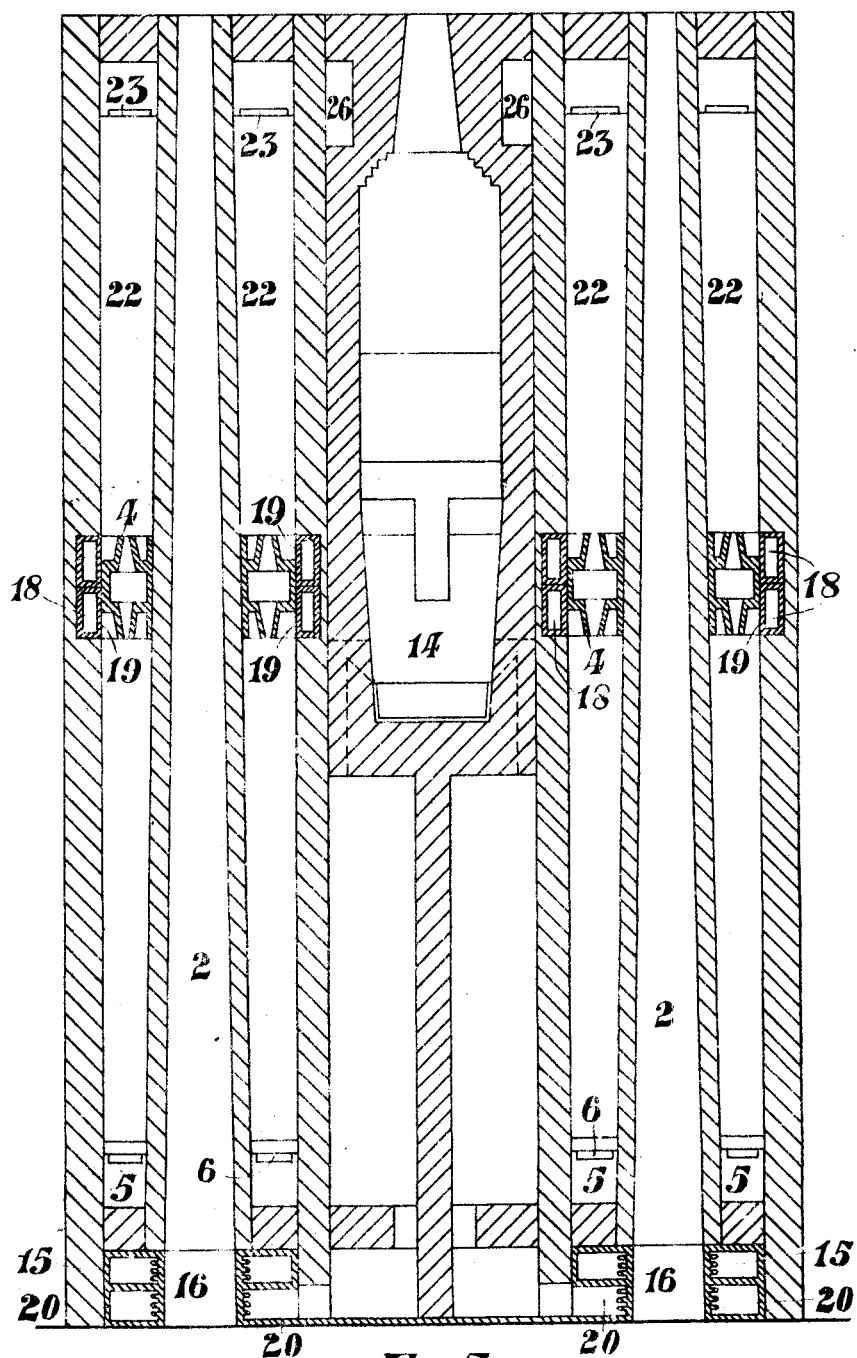
Figure 6:
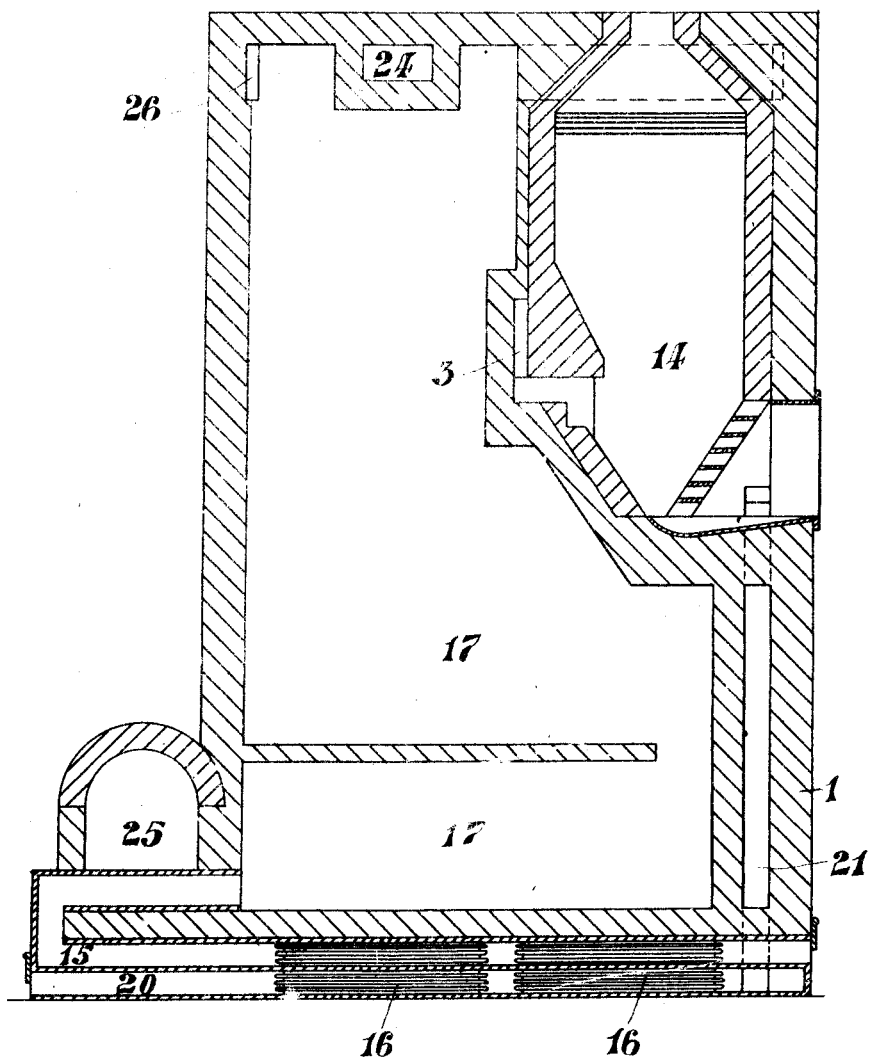
Figure 7:
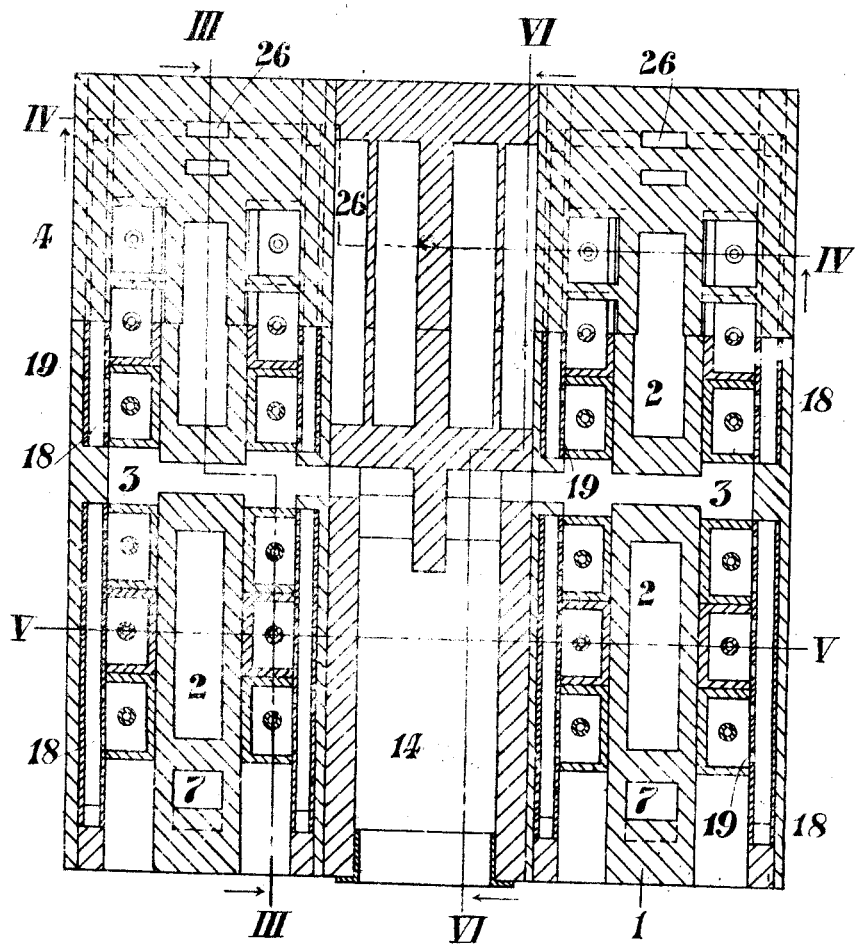

In the accompanying drawings, Figures 1 and 2 illustrate a means for heating the retorts in which the second stream of hot gases, heating the upper portion of each retort, is derived from or is a continuation of the first stream, which has heated the lower portion of the retort containing the hot coke, either stream being sub-divided as may be found desirable. Figs. 1A and 2A are views corresponding to Figs. 1 and 2 respectively, but illustrating slight modifications hereinafter described. Fig. 3 is a section taken on the line III—III of Fig. 7, showing a further modification in which each stream of heating gases comes from an independent set of burners; Fig. 4 is a section taken on the line IV—IV of Fig. 7; Fig. 5, a section taken on the line V—V of Fig. 7; Fig. 6, a section taken on the line VI—VI of Fig. 7; and Fig. 7, a sectional plan taken on the line VII—VII of Fig. 3.

Referring firstly to Figs. 1 and 2, the former of which is a section taken on the line I—I in Fig. 2, while the latter is a sectional plan taken on the line II—II in Fig. 1, the reference numeral 1 indicates the front wall of the setting, 2 the retorts, 3 the flue supplying producer gas, which latter meets the secondary air at the burners 4, (the said secondary air arriving through ports 4ª) and heats the lower portion of the retort in its downward travel to the flue 5, its entry to the flue 5 being if desired controlled by a damper or dampers 6. Thence the hot gases pass up the passage or passages 7 to form a second stream which proceeds about the upper portion of the retort, which is thus heated to an intermediate degree, in accordance with the theory of this invention as before set out. The damper 8 controls the entry of this second stream of gases to the top flue 9, from which the gases pass through the port 10 to the regenerator.

The numerals 11 in Fig. 2 indicate secondary air passages.

If found desirable the partitions 12 may be perforated and the dampers 6 may be dispensed with, as shown in Fig. 1A, in which case the function of controlling the entire draft through the heating chambers of one side of one retort is performed by the single damper 8. The partition 13 may also be dispensed with, as shown in Fig. 2A when the divided stream passing down the sides of the retort is re-concentrated in a single ascending passage 7, whereby the last traces of combustible gas which may exist in the stream coming from one burner will be burned by excess air admitted by another burner, and the heat generated utilized on the retort as fully as possible. Fig. 1A also shows in a somewhat exaggerated form the differential taper of the retort hereinbefore mentioned.

In the modification illustrated by Figs. 3 to 7 the producer gas coming from the producer 14 into the flues 3 passes through the burners 4. The secondary air passes through the flue 15, in contact with extensions 16 of the retorts, which extensions may be provided with ribs to increase their contact surface, then through the regenerator 17 and is then led by flues 18 to the burners 4, these flues being provided with delivery orifices 19 as shown in Figs. 3, 4, 5 and 7. The burners may be of the construction shown, or of any other type or form preferred. The primary air enters the flues 20 and proceeds through the flues 21 to the producer 14. The fuel gases which have heated the upper portions of the retorts pass from the heating flues 22 controlled by dampers 23 to the mixing chamber 24 and thence to the waste gas passages of the regenerator and ultimately to the main flue 25. The descending stream of heating gases after passing the dampers 6 ascends the flue 7 and enters the mixing chamber 24. The waste gas regenerator may be of any suitable type; the numerals 26, 26, indicate secondary air passages in general.

Having thus described my invention, what I claim as new and desire to secure by Letters Patent is:

1. In a setting for vertical gas retorts, means for heating said retorts comprising air passages, gas passages and burners arranged to apply the maximum heat to the retort at a point midway of its length, to apply a less degree of heat at a point higher than that above mentioned, but somewhat below the upper end of said retort, said means also including passages whereby the air and gas from the point of maximum heat are conducted down the side of the retort for the purpose set forth.

2. Vertical gas retorts provided with, producer gas passages, burners supplied thereby at a point between the ends of said retort, secondary air passages directing the air to the gas at said burners, passages leading the mixed gas and air from said burners down the side of the retort to the lower part thereof for heating the latter and additional passages leading this mixture after such heating action up to a point above the said burners but below the retort top and applying it to the upper part of said retort at a moderate interval below said top substantially as set forth.

3. Vertical gas retorts provided with, producer gas passages, burners supplied thereby at a point between the ends of each retort, secondary air passages directing the air to the gas at said burners, passages leading the mixed gas and air from said burners down the side of the retort to the lower part thereof for heating the latter and additional passages leading this mixture after such heating action up to a point above the said burners but below the retort top and applying it to the upper part of said retort at a moderate interval below said top, the said upward and downward passages being longitudinally divided into separate flues or channels and provided with dampers for individually controlling the same.

4. Vertical gas retorts provided externally with longitudinal passages, in combination with means for supplying air and gas for combustion at a point between the top and bottom of each retort, so that the heated gases pass down the side of the retort to heat its lower part, a passage extending from the bottom of the retort upwardly to a point above the first mentioned and a mixing chamber 24 at the upper end of the retort communicating with the last mentioned passage for the reception of the spent gases.

5. Vertical gas retorts provided externally with longitudinal passages, in combination with means for supplying air and gas for combustion at a point between the top and bottom of each retort, so that the heated gases pass down the side of the retort to heat its lower part, and a passage extending from the lower part of the retort to the upper part thereof, for conducting the said gases at a reduced temperature to said upper part as set forth.

In testimony whereof, I have signed my name to this specification in the presence of two subscribing witnesses.

HERBERT JOHN TOOGOOD.

Witnesses:
 ERNEST PRIESTLEY NEWTON,
 JAMES LESLIE WILKINSON.